US005862069A

United States Patent [19]
Nestler

[11] Patent Number: 5,862,069
[45] Date of Patent: Jan. 19, 1999

[54] FOUR QUADRANT MULTIPLYING APPARATUS AND METHOD

[75] Inventor: Eric Nestler, Harvard, Mass.

[73] Assignee: Analog Devices, Inc., Norwood, Mass.

[21] Appl. No.: 682,838

[22] Filed: Jul. 12, 1996

[51] Int. Cl.[6] .......... G06F 7/52
[52] U.S. Cl. .......... 364/754.01
[58] Field of Search .......... 324/141, 142; 341/143, 166; 364/483, 724.1, 754.01, 736.01

[56] References Cited

U.S. PATENT DOCUMENTS

| | | | |
|---|---|---|---|
| 3,953,795 | 4/1976 | Brunner et al. | 324/142 |
| 4,055,804 | 10/1977 | Mayfield | 324/142 |
| 4,378,524 | 3/1983 | Steinmüller | 324/107 |
| 4,706,066 | 11/1987 | Dijkmans | 340/347 |
| 4,752,731 | 6/1988 | Toda | 324/142 |
| 4,786,863 | 11/1988 | Milkovic | 324/142 |
| 4,795,974 | 1/1989 | Landman et al. | 324/142 |
| 4,920,312 | 4/1990 | Maruyama | 324/141 |
| 4,924,412 | 5/1990 | Leydier | 364/483 |
| 5,099,195 | 3/1992 | Greer et al. | 324/142 |
| 5,309,385 | 5/1994 | Okamoto | 364/736.03 |

FOREIGN PATENT DOCUMENTS

| | | |
|---|---|---|
| 0 296 968 | 12/1988 | European Pat. Off. . |
| 0 434 248 A2 | 6/1991 | European Pat. Off. . |
| 0 434 248 B1 | 6/1991 | European Pat. Off. . |
| WO86/03302 | 6/1986 | WIPO . |

OTHER PUBLICATIONS

A Power Metering ASIC with a Sigma–Delta–Based Multiplying ADC, ISSCC94/Session 11/Oversampled Data Conversion/Paper TP11.1, IEEE International Solid–State Circuits Conf., 37, 1994, 2 pages.

Oversampling–Based Balanced Modulator, O'Leary et al., Electronics Letters, Jan. 3, 1991, Vo., 27, No. 1 pp. 66–68.

An Oversampling Converter for Strain Gaude Transducers, Kerth et al, IEEE J of Solid–State Cir., vol. 27, No 12., pp. 1689–1696.

*Primary Examiner*—Chuong Dinh Ngo
*Attorney, Agent, or Firm*—Wolf, Greenfield & Sacks, P.C.

[57] ABSTRACT

An apparatus and a method for multiplying two time varying signals to produce a four quadrant, multiplied signal is provided. In one embodiment of the present invention, an apparatus for multiplying a first signal with a second signal includes an analog-to-digital converter that provides a first digital signal representative of the first signal, a first modulator that provides a first modulated signal representative of the second signal, a multiplier that multiplies the first digital signal by the first modulated signal and provides a second digital signal representative of a result of a multiplication of the first signal and the second signal, and a first filter having an input to receive the second digital signal and having an output that provides the multiplied signal.

15 Claims, 4 Drawing Sheets

FOUR QUADRANT MULTIPLYING APPARATUS AND METHOD

FIELD OF THE INVENTION

The present invention relates generally to a method and apparatus for multiplying two signals, and more particularly to a method and apparatus for providing four quadrant multiplication of two time varying signals.

DISCUSSION OF THE RELATED ART

Prior art multipliers for providing four quadrant multiplication of two analog signals are well known. These prior art multipliers include analog multipliers and digital multipliers. One example of an analog four quadrant multiplier is the AD534, manufactured by Analog Devices, Incorporated, Norwood, Mass. Analog multipliers are typically less accurate than digital multipliers and, when used in AC power meter applications, may suffer from reduced linearity and DC offset errors.

Another example of an analog multiplier is disclosed in U.S. Pat. No. 3,953,795 to Brunner. The Brunner patent discloses a kilowatt-hour meter for an electrical power line. The kilowatt-hour meter includes a pulse-width amplitude modulation scheme for modulating a first signal, representative of a load voltage, by a second signal, representative of a load current, such that the average value of the resulting modulated signal is proportional to the product of the load current and the load voltage. The disclosed meter for generating the modulated signal is primarily an analog meter, and thus suffers from the aforementioned drawbacks of analog meters.

Digital multipliers have been used in digital decimation filters, wherein an n-bit impulse response of the digital decimation filter is multiplied by a one-bit output data stream of a sigma-delta modulator. One example of a data acquisition system using a digital decimation filter in this manner is disclosed in "An Oversampling Converter for Strain Gauge Transducers", by Donald A. Kerth and Douglas S. Piasecki in *The IEEE Journal of Solid-State Circuits,* Vol. 27, No. 12, Dec. 1992.

The AD1879 Analog to Digital Converter manufactured by Analog Devices Inc. also includes a digital decimation filter incorporating a digital multiplier as described above. The digital decimation filter employed in the AD1879 is implemented using a coded Read Only Memory (ROM) to provide the impulse response of the filter. The impulse response of the filter is convolved with a time-varying input signal represented by the one-bit output data stream of a sigma-delta modulator to achieve a product of the time varying input signal and the impulse response of the filter. These digital decimation filters of the prior art do not provide for the multiplication of two time-varying signals, but rather, provide for the multiplication of one time-varying signal by a fixed impulse response of the filter.

One application of four quadrant multipliers is for use in watt-hour meters. One example of a watt-hour meter that multiplies two one-bit digital data streams is disclosed in European Patent Application 90313050 to The General Electric Company. One of the two one-bit digital data streams is representative of the current supplied to a load and the other of the two one-bit digital data streams is representative of the voltage across the load. In the disclosed watt-hour meter, an accumulator is used to accomplish the multiplication of the two data streams and to generate an output signal having a pulse rate that is representative of the power supplied to the load. The watt-hour meter disclosed does not provide an output signal representative of the product of two input time-varying signals.

Another example of a power meter that multiplies two time varying signals is disclosed in an article entitled "A Power Meter ASIC With a Sigma-Delta-Based Multiplying ADC" by F. Op 't Eynde, published in the ISSCC94 Proceedings, paper TP 11.1. In the system disclosed by Eynde, a one-bit data stream from a sigma delta modulator is multiplied in the analog domain with a second input time varying signal. The resulting product is digitized using a second sigma-delta modulator. Since the multiplication in the Eynde system is accomplished in the analog domain, the system suffers from the same drawbacks as the analog multipliers discussed above.

It is an object of the present invention to provide a low cost, accurate, four quadrant multiplier for multiplying two time-varying input signals to produce a real-time, four quadrant multiplied signal.

SUMMARY OF THE INVENTION

In embodiments of the present invention, an apparatus and a method is provided for multiplying two time-varying input signals to produce a real time, time varying, four quadrant multiplied signal.

In one embodiment of the present invention, an apparatus for multiplying a first signal with a second signal to produce a multiplied signal includes an analog-to-digital converter that provides a first digital signal representative of the first signal, a first modulator that provides a first modulator output signal representative of the second signal, a multiplier that provides a second digital signal representative of the result of a multiplication of the first signal and the second signal.

In a preferred embodiment, the apparatus for multiplying further includes a first filter that receives the second digital signal and provides a filtered multiplied output signal, and the analog-to-digital converter of the apparatus for multiplying includes a second modulator that receives the first signal and provides a second modulator output signal, a second filter that filters the second modulated signal to produce a filtered signal, and an interpolator that receives the filtered signal and provides the first digital signal.

In the preferred embodiment, the multiplier includes an adder that provides an adder output signal representative of a difference between the first digital signal and a reference voltage, and the multiplier includes a multiplexer that selects, based on a value of the first modulator output signal, either the adder output signal or the first digital signal as the second digital signal.

Another embodiment of the present invention is directed to a method for multiplying a first signal with a second signal to provide a multiplied signal. The method includes steps of generating an n-bit signal corresponding to the first signal, the n-bit signal having n bits, each of the n bits having one of a first or a second value respectively corresponding to a first and a second logical value, generating a modulated signal corresponding to the second signal, the modulated signal having one of a first or a second value respectively corresponding to a first and a second logical value, generating the multiplied signal such that the multiplied signal is equal to the n-bit signal when the modulated signal has the first logical value, and such that the multiplied signal is equal to an inversion of the n-bit signal when the modulated signal is equal to the second logical value. In a preferred embodiment, the method further includes a step of filtering the multiplied signal to generate a filtered multiplied signal.

In yet another embodiment of the present invention, an apparatus is provided for multiplying a first signal with a second signal to provide a multiplied signal. The apparatus includes means for generating an n-bit signal corresponding to the first signal, means for generating a modulated signal corresponding to the second signal, and means for generating the multiplied signal, the multiplied signal being equal to the n-bit signal when the modulated signal has a first logical value, and the multiplied signal being equal to an inversion of the n-bit signal when the modulated signal has a second logical value. In a preferred embodiment, the apparatus also includes means for filtering the multiplied signal to generate a filtered multiplied signal.

In a preferred embodiment, the means for generating the first n-bit signal in the embodiment of the invention described above further includes means for generating a one-bit modulated signal corresponding to the first signal, means for filtering the one-bit modulated signal to provide a filtered signal, and means for sampling the filtered signal to generate the first n-bit signal. Further, in the preferred embodiment, the means for sampling includes means for encoding the first n-bit signal using 1's compliment numeric coding.

BRIEF DESCRIPTION OF THE DRAWINGS

For a better understanding of the present invention, reference is made to the accompanying drawings which are incorporated herein by reference and in which.

DETAILED DESCRIPTION

Figure 1:
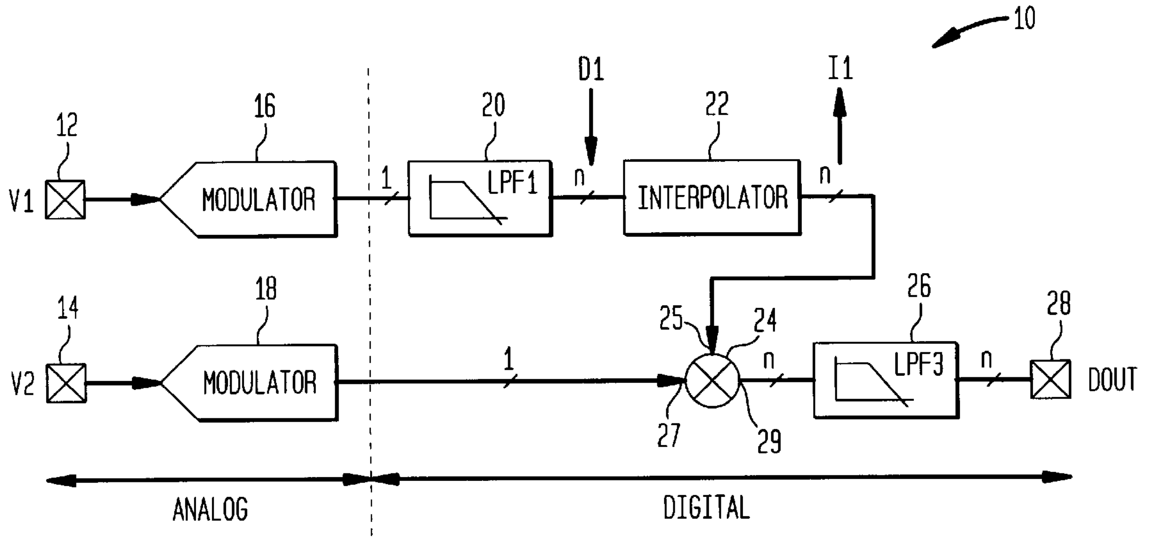
FIG. 1 is a block diagram of a four quadrant multiplier in accordance with one embodiment of the present invention.

FIG. 1 shows a block diagram of a four quadrant multiplier 10 in accordance with one embodiment of the present invention. The four quadrant multiplier 10 includes first and second modulators 16 and 18, a first low-pass filter 20, an interpolator 22, a multiplier 24, and a second low-pass filter 26. The embodiment of the four quadrant multiplier shown in FIG. 1 operates by providing at an output 28 of the four quadrant multiplier, an n-bit signal representative of the instantaneous product of input signals V1 and V2 received at inputs 12 and 14 of the multiplier. The input signals V1 and V2 are time-varying analog signals.

Each of the first and second modulators 16 and 18 is an oversampling sigma-delta modulator (sometimes referred to as a "delta-sigma modulator") that provides a one-bit output data stream at a predetermined data rate. In a preferred embodiment of the present invention, each of the sigma-delta modulators 16 and 18 can be, for example, implemented using a programmable sigma-delta modulator as disclosed in U.S. Pat. No. 5,134,401 to McCartney.

The one-bit output data stream of each of the first and second modulators 16 and 18 is a serial stream of bits having a logical value of "1" or "−1". The data rate (or bit rate) of each serial stream of bits is equal to the sample rate of the modulator from which the serial stream is generated. The ratio of the number of bits of the data stream having a value of "1" to the number of bits having a value of "−1" over a given time period at the output of each of the first and second modulators 16 and 18 provides an indication of the magnitude of the analog signals received at the inputs 12 and 14. As indicated in FIG. 1, each of the first and second modulators 16 and 18 provides an analog-to-digital conversion of the analog signal received at its input.

The first low-pass filter 20 provides low-pass digital filtering and decimation of the one-bit output data stream of the first modulator 16. The first low-pass filter filters out high frequency noise produced by the first modulator 16. The first low-pass filter 20 also acts as a decimator and converts the one-bit output data stream at the input of the first low-pass filter to an n-bit data stream, where n is an integer greater than 1, and in a preferred embodiment of the present invention, n is equal to 16. The n-bit data stream output from the first low-pass filter 20 has a data rate equal to the sample rate of the first modulator 16 reduced by a decimation factor (D1) of the first low-pass filter.

The interpolator 22 receives the n-bit data stream from the first low-pass filter 20 and performs an up sampling of the n-bit data stream by a factor equal to I1. In one embodiment of the multiplier shown in FIG. 1, the up sample factor I1 of the interpolator 22 is equal to the decimation factor D1 of the first low-pass filter 20, and the sample rate of the first modulator 16 is equal to the sample rate of the second modulator 18 and is equal to 1 megahertz. In this embodiment, the n-bit signal output from the interpolator is at the same data rate as the one-bit signal output from the second modulator 18. In a preferred embodiment, the output of the interpolator 22 is a 16-bit signal that is encoded using 2's complement numeric coding.

In another embodiment of the multiplier shown in FIG. 1, the sample rate of the first modulator 16 is not equal to the sample rate of the second modulator 18. In this embodiment, the ratio (D1/I1) of the decimation factor (D1) of the first low-pass filter 20 to the up sample factor (I1) of the interpolator 22 can be selected such that the n-bit output data stream of the interpolator 22 and the one-bit output data stream of the second modulator 18 are at the same data rate. In this embodiment, the ability to sample the input signals V1 and V2 at different sample rates provides additional flexibility in multiplying dissimilar signals.

In another embodiment of the present invention, the data rate of the n-bit output signal from the interpolator 22 is not the same as the data rate of the one-bit data stream output from the second modulator 18, rather, the data rate of the n-bit signal is lower than the data rate of the one-bit data stream output from the second modulator 18. In this embodiment, the multiplier 24 acts as an interpolator and up samples the n-bit data stream output from the interpolator 22, such that the data rate of the up sampled signal is equal to the data rate of the one-bit data stream output from the second modulator 18. The operation of the multiplier 24 to perform this interpolation is described in greater detail below.

Figure 2:
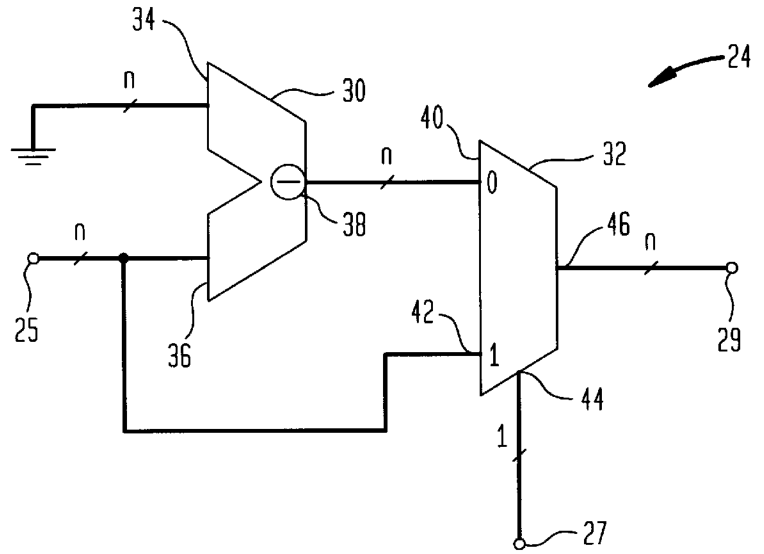
FIG. 2 is a block diagram showing a multiplier of FIG. 1 in greater detail.

The multiplier 24 has a first input 25 coupled to the output of the interpolator 22, a second input 27 coupled to the output of the second modulator 18 and an output 29 coupled to the second low-pass filter 26. The multiplier 24 of FIG. 1 is shown in greater detail in FIG. 2. As shown in FIG. 2, the multiplier 24 includes an adder 30 and a selector 32. The adder 30 is a standard 2's complement adder functioning as a negation operator. The adder 30 has a first input 34, a second input 36 and an output 38. The adder is configured such that an output signal at output 38 of the adder is equal to an input signal at the first input 34 minus an input signal at the second input 36. As shown in FIG. 2, the first input 34 of the adder 30 is coupled to a signal reference n-bit digital value (ground), and the second input 36 of the adder 30 is coupled to the first input of the multiplier 24 to receive the n-bit data stream output from the interpolator 22. Thus, since the input signal at input 34 of the adder is essentially equal to zero, the output signal at output 38 of adder 30 is equal to the negative of the n-bit data stream at input 36. As discussed above, in a preferred embodiment, the output of the interpolator 22 is encoded using 2's complement numeric coding. The use of 2's complement numeric coding simplifies the operation of the adder 30.

The multiplexer 32 of the multiplier 24 is a standard two-to-one multiplexer and may be implemented in one of many known ways using transfer gates, two-input and gates or nor gates. The multiplexer 32 has three inputs 40, 42 and 44 and one output 46. Input 40 is coupled to the output 38 of the adder 30 to receive the n-bit signal corresponding to the negative of the n-bit signal output from the interpolator 22. Input 42 of multiplexer 32 is coupled to the first input 25 of the multiplier 24 to receive the n-bit signal output from the interpolator 22, and input 44 of the multiplexer 32 is coupled to the second input 27 of the multiplier to receive the one-bit data stream output from the second modulator 18.

The multiplexer 32 provides either the input signal at the first input 40 of the multiplexer or the input signal at the second input 42 of the multiplexer as the output signal of the multiplexer at output 46 depending on a value of the signal received at input 44.

As discussed above, the one-bit data stream output from the second modulator 18 has a logical value equal to "1" or "−1". When the output of the modulator 18 has a logical value of 1, the multiplexer selects the signal at the second input 42 as the output signal of the multiplexer, and when the logical value of the output signal of the modulator 18 has a value of "−1", the multiplexer 32 selects the input signal at the first input 40 as the output signal at the output 46. Thus, the output signal of the multiplexer is equal to the one-bit output of the second modulator multiplied by the n-bit output of the interpolator 22.

As discussed above, the data rate of the one-bit data stream output from the second modulator 18 can be greater than the data rate of the n-bit data stream output from the interpolator 22. When this occurs, there is an implied zero-order interpolation operating at the input of the multiplexer 32 that effectively interpolates (or up samples) the output of the interpolator 22 to the sample rate of the second modulator 18. The n-bit output data stream, provided at the output 46 of the multiplexer 32, is at the data rate of the one-bit data stream received at input 44 of the multiplexer.

The second low-pass filter 26, similar to the first low-pass filter 20, provides low-pass digital filtering. The second low-pass filter 26 receives the output signal from the multiplier 24 and removes quantization noise from the output signal generated in the second modulator 18. The output of the second low-pass filter 26 is an n-bit, real time, four quadrant multiplied result of the two analog signals V1 and V2 received at inputs 12 and 14 of the four quadrant multiplier 10. The second low-pass filter 26 is not an essential element of the four quadrant multiplier, but as discussed below is effective in reducing noise in the output multiplied signal.

Figure 3A:
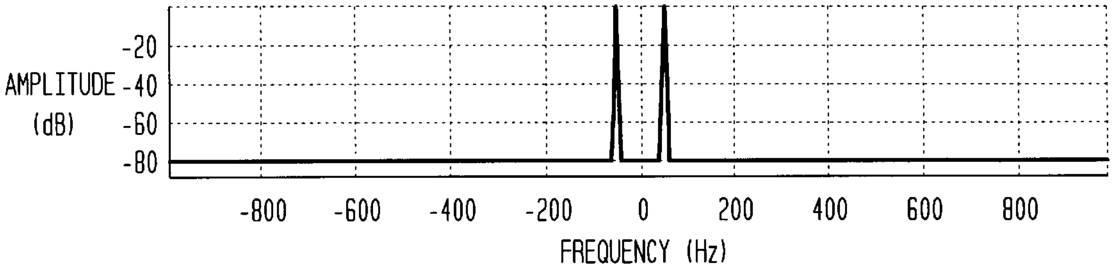
FIG. 3A shows the frequency spectrum of a first input signal to an ideal multiplier.
Figure 3B:
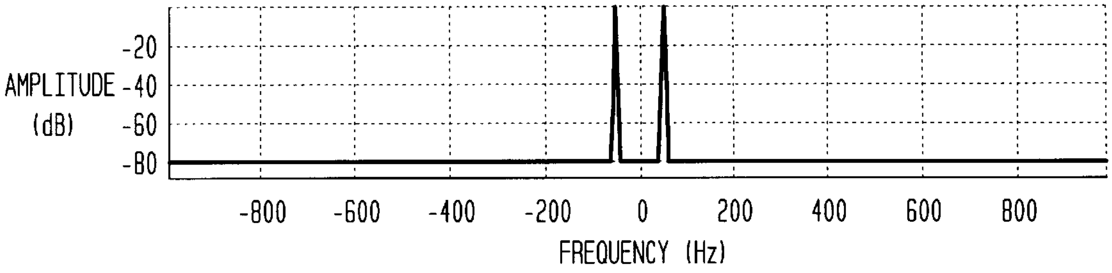
FIG. 3B shows the frequency spectrum of a second input signal to an ideal multiplier.
Figure 3C:
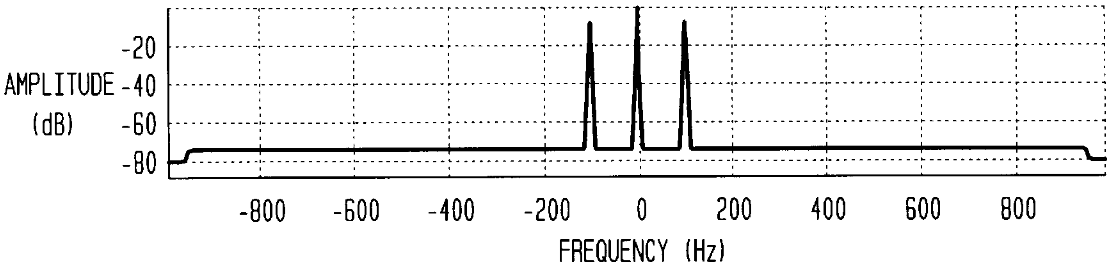
FIG. 3C shows the frequency spectrum of an output signal from the ideal multiplier with the first and second signals whose frequency spectra are shown respectively in FIGS. 3A and 3B input to the ideal multiplier.

The operation of a four quadrant multiplier in accordance with embodiments of the present invention, will now be further explained with reference to FIGS. 3–5. FIGS. 3A and 3B respectively show the frequency spectrum of a first analog signal and a second analog signal. Each of the first and the second analog signals is a sine wave signal, and thus, the frequency spectrum of each of the signals consists of a single impulse at the sine wave frequency, as shown in FIGS. 3A and 3B. When the first and second analog signals are multiplied together (using an ideal multiplier), the output multiplied signal is a sine wave signal of twice the input frequency plus a DC term. The frequency spectrum of the output multiplied signal is shown in FIG. 3C. Multiplication of two signals in the time domain corresponds to a convolution of the two signals in the frequency domain. Thus, any noise associated with either of the first and the second analog signals will convolve with the impulse of the other signal to create spurious noise at all of the sums and differences of the noise frequencies and the impulse frequency in the frequency domain. In FIG. 3C, it can be seen that the noise floor of the frequency spectrum of the output multiplied signal is raised with respect to the noise floor of each of the first and second analog signals because of this convolution.

Figure 4A:
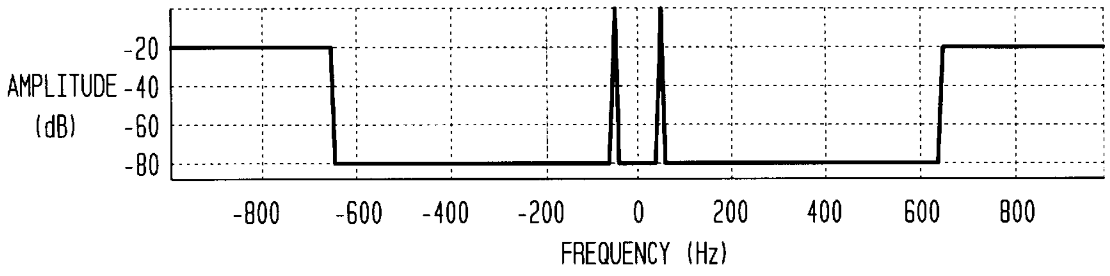
FIG. 4A shows the frequency spectrum of an output signal from a first sigma-delta modulator.
Figure 4B:
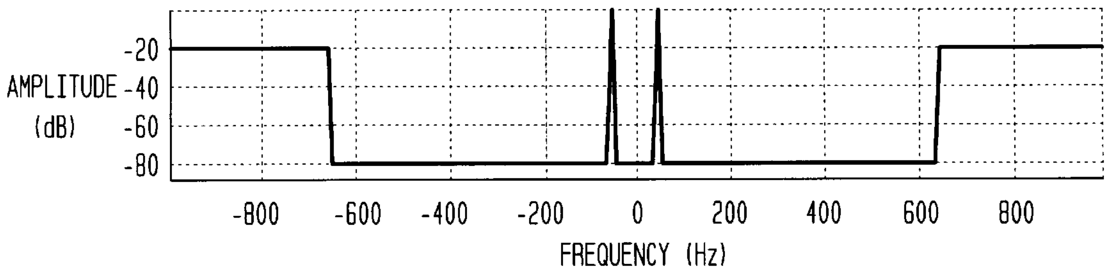
FIG. 4B shows the frequency spectrum of an output signal from a second sigma-delta modulator.
Figure 4C:
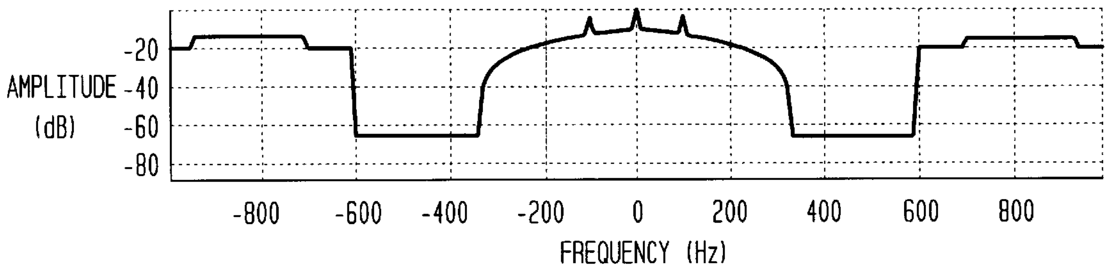
FIG. 4C shows the frequency spectrum of a signal representative of the product of the signals whose frequency spectra are shown in FIGS. 4A and 4B.

FIGS. 4A and 4B respectively show the frequency spectrum of the one-bit data stream output from the first and second modulators 16 and 18 of FIG. 1 with first and second input analog signals to the first and second modulators having the frequency spectrum shown respectively in FIGS. 3A and 3B. If each of the output data streams of the first and second modulators 16 and 18 is directly input into a multiplier, then the resulting frequency spectrum of the multiplied signal would be that shown in FIG. 4C. As discussed above, time domain multiplication corresponds to a convolution in the frequency domain. The convolution provides a sum and difference of all frequencies in the frequency domain, and thus, the high frequency noise associated with the one-bit data streams output from each of the first and second modulators 16 and 18 (as shown in FIGS. 4A and 4B) is translated by the sums and differences of the high frequency noise down into the frequency passband of interest as shown in FIG. 4C providing a high noise floor in the passband of interest of the multiplier.

Figure 5A:
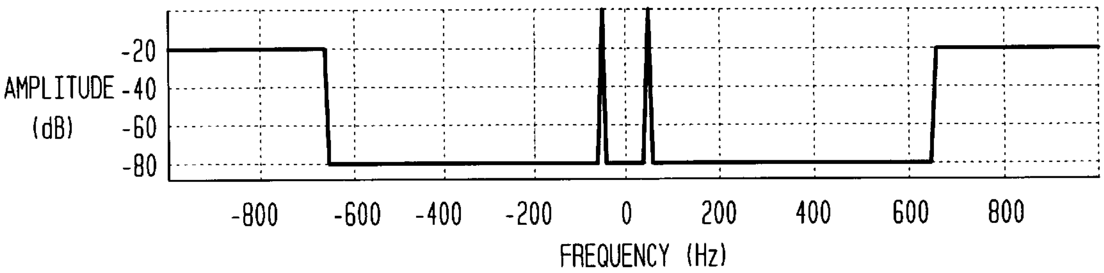
FIG. 5A shows the frequency spectrum of the output signal of the first modulator 16 of FIG. 1.
Figure 5B:
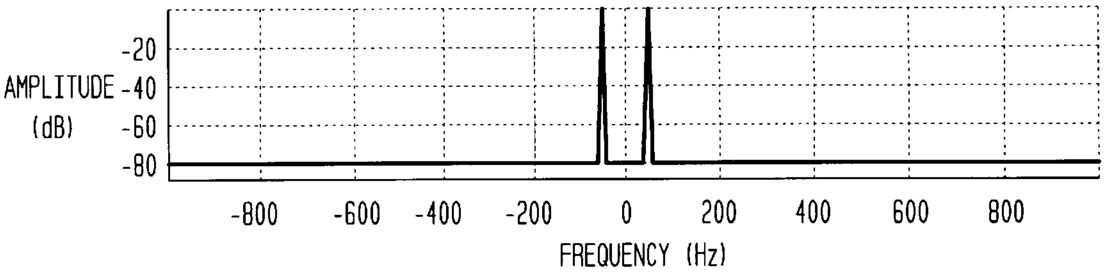
FIG. 5B shows the frequency spectrum of the output signal of the second modulator 18 of FIG. 1.
Figure 5C:
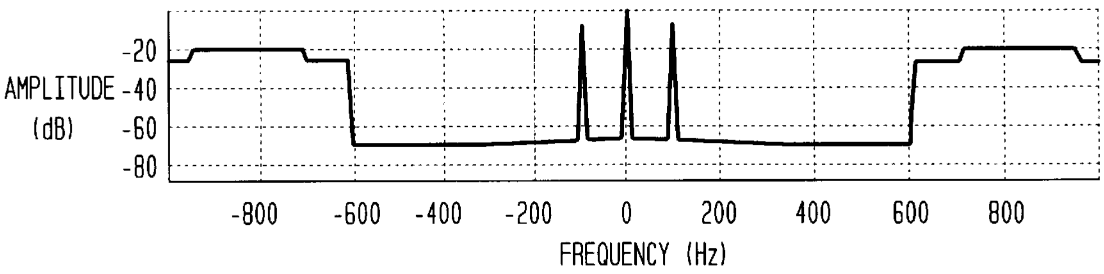
FIG. 5C shows the frequency spectrum of the output signal of the multiplier 24 of FIG. 1.

In the embodiment of the present invention shown in FIG. 1, the one-bit data stream output from the first modulator 16 is filtered and interpolated before being multiplied with the one-bit data stream output from the second modulator 18. The frequency spectrums of the input signals at inputs 27 and 25 of the multiplier 24 of FIG. 1 are shown in FIGS. 5A and 5B, respectively. As shown in FIG. 5B, the high frequency noise created by the aliasing in the first modulator 16 is reduced by the first low-pass filter 20. The resulting frequency spectrum obtained by multiplying the frequency spectrum of FIG. 5A with that of FIG. 5B in the multiplier 24 is shown in FIG. 5C and corresponds to the frequency spectrum of the output signal of the multiplier 24. The noise floor of the frequency spectrum of the output signal from the multiplier 24 is somewhat worse than the ideal case shown in FIG. 3C, but is improved over the noise floor shown in FIG. 4C. Thus, embodiments of the present invention, provide for the multiplication of two digital data streams output from sigma-delta modulators without excessive noise in the passband of interest.

Embodiments of the present invention described above, can be used in several multiplication applications, including but not limited to, power applications, wherein the input signals to be multiplied respectively represent the current supplied to a load and the voltage across the load. Other applications for multipliers in accordance with embodiments of the present invention, include the squaring of an input signal (for example, in calculating a true RMS value of a time varying signal), wherein each of inputs 12 and 14 are provided with the same input signal.

In preferred embodiments of the invention described above, the output of the sigma-delta modulators 16 and 18 have been described as one-bit data streams. Sigma-delta modulators having output data streams other than one-bit may also be used in embodiments of the present invention.

Embodiments of the present invention described above use a mixed-signal architecture, in which the input signals are analog signals, and in which analog sigma-delta modulators and digital processing are used. As understood by those skilled in the art, the present invention is not limited to analog signals as the input signals, and in systems which use only a digital architecture, the bit-stream signals can be generated using digital input signals and digital sigma-delta modulators.

There are several advantages of multipliers constructed in accordance with embodiments of the present invention. One significant advantage is that the multiplier 24 can be implemented with relatively little hardware. The inputs to the multiplier 24 consist of an n-bit signal and a one-bit signal. In one embodiment of the invention, the n-bit signal is encoded using 1's complementary numeric coding. The multiplication of these signals is accomplished in this embodiment by simply digitally inverting each bit of the n-bit signal when the one-bit signal has a negative value.

Another advantage of embodiments of the present invention is the ability to digitally alter the input signals to the multiplier 24. One example of digitally altering the signals is to include a digital high-pass filter to one of the input signals. Because the high pass filter is accomplished in the digital domain, an accurate correction for offsets in the input signals can be attained. The ability to digitally correct the input signals prior to multiplication is a significant advantage of embodiments of the present invention used in power measurement applications.

Having thus described at least one illustrative embodiment of the invention, various alterations, modifications and improvements are readily occurred to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

I claim:

1. An apparatus for multiplying a first signal by a second signal to provide a multiplied signal, the apparatus comprising:

an analog-to-digital converter having an input to receive the first signal, and an output that provides a first digital signal representative of the first signal;

a first modulator having an input that receives the second signal and an output that provides a first modulated signal representative of the second signal;

a multiplier having a first input coupled to the output of the analog-to-digital converter to receive the first digital signal, a second input coupled to the output of the first modulator that receives the first modulated signal, and an output that provides the multiplied signal; and a first filter having an input that receives the multiplied signal and an output that provides a filtered multiplied signal;

wherein the analog-to-digital converter includes:

a second modulator having an input, coupled to the input of the analog to digital converter to receive the first signal, and having an output that provides a second modulated signal;

a second filter having an input coupled to the output of the second modulator to receive the second modulated signal and having an output that provides a filtered signal; and an interpolator having an input coupled to the output of the filter to receive the filtered signal and an output that provides the first digital signal.

2. The apparatus of claim 1, wherein the multiplier includes an adder having a first input coupled to the first input of the multiplier to receive the first digital signal, a second input coupled to a digital reference value, and an output that provides an adder output signal representative of a difference between the first digital signal and the reference voltage.

3. The apparatus of claim 2, wherein the multiplier further includes a multiplexer having a first input coupled to the output of the adder to receive the adder output signal, a second input coupled to the first input of the multiplier to receive the first digital signal, a third input coupled to the second input of the multiplier to receive the first modulated signal, and an output coupled to the output of the multiplier to provide the multiplied signal, the multiplexer selecting one of the adder output signal and the first digital signal as the multiplied signal based on a value of the first modulated signal.

4. The apparatus of claim 3, wherein:

the first modulator has a first sample rate corresponding to a data rate of the first modulated signal;

the second modulator has a second sample rate corresponding to a data rate of the second modulated signal; and the first sample rate is different from the second sample rate.

5. The apparatus of claim 4, wherein:

the second filter has a decimation factor equal to the data rate of the second modulated signal divided by a data rate of the filtered signal;

the interpolator has an up sample factor equal to a data rate of the first digital signal divided by the data rate of the filtered signal; and the decimation factor of the second filter is equal to the up sample factor of the interpolator.

6. The apparatus of claim 5, wherein the data rate of the first modulated signal is not equal to the data rate of the first digital signal, and wherein the multiplier provides an interpolation of the first digital signal so that a data rate of the multiplied signal is equal to the data rate of the first modulated signal.

7. The apparatus of claim 6, wherein the first digital signal is encoded by the interpolator using 1's complement numeric coding.

8. The apparatus of claim 7, wherein the multiplier functions as an inverter when the first modulated signal has a first logical value such that the second digital signal is generated by inverting each bit of the first digital signal from either a first logical value to a second logical value or from the second logical value to the first logical value.

9. The apparatus of claim 1, wherein:

the first modulator has a first sample rate corresponding to a data rate of the first modulated signal;

the second modulator has a second sample rate corresponding to a data rate of the second modulated signal; and the first sample rate is different from the second sample rate.

10. The apparatus of claim 9, wherein:

the second filter has a decimation factor equal to the data rate of the second modulated signal divided by a data rate of the filtered signal;

the interpolator has an up sample factor equal to a data rate of the first digital signal divided by the data rate of the filtered signal; and the decimation factor of the second filter is equal to the up sample factor of the interpolator.

11. The apparatus of claim 10, wherein the data rate of the first modulated signal is not equal to the data rate of the first digital signal, and wherein the multiplier provides an interpolation of the first digital signal so that a data rate of the multiplied signal is equal to the data rate of the first modulated signal.

12. A method for multiplying a first signal with a second signal to provide a multiplied signal, the method comprising steps of:

generating an n-bit signal corresponding to the first signal, the n-bit signal having n bits, each of the n bits having one of a first or a second value respectively corresponding to a first and a second logical value;

generating a modulated signal corresponding to the second signal, the modulated signal having one of a first or a second value respectively corresponding to a first and a second logical value;

generating the multiplied signal such that the multiplied signal is equal to the n-bit signal when the modulated signal has the first logical value, and such that the multiplied signal is equal to an inversion of the n-bit signal when the modulated signal is equal to the second logical value, wherein the inversion of the n-bit signal corresponds to the first n-bit signal with each of the bits inverted from the first logical value to the second logical value or from the second logical value to the first logical value; and filtering the multiplied signal;

wherein the step of generating the n-bit signal includes steps of:

generating a one-bit modulated signal corresponding to the first signal;

filtering the one-bit modulated signal to provide a filtered signal; and sampling the filtered signal to generate the n-bit signal.

13. The method of claim 12, wherein the step of sampling includes a step of encoding the n-bit signal using 1's complement numeric coding.

14. An apparatus for multiplying a first signal with a second signal to provide a multiplied signal, the apparatus comprising:

means for generating an n-bit signal corresponding to the first signal, the n-bit signal having n bits, each of the n bits having one of a first or a second value respectively corresponding to a first and a second logical value;

means for generating a modulated signal corresponding to the second signal, the modulated signal having one of a first or a second value respectively corresponding to a first and a second logical value;

means for generating the multiplied signal, coupled to the means for generating the first input signal and coupled to the means for generating the first one-bit signal, the multiplied signal being equal to the n-bit signal when the modulated signal has the first logical value, and the multiplied signal being equal to an inversion of the n-bit signal when the modulated signal is equal to the second logical value, wherein the inversion of the n-bit signal corresponds to the n-bit signal with each of the bits inverted from the first logical value to the second logical value or from the second logical value to the first logical value; and means for filtering the multiplied signal to generate a filtered multiplied signal, the means for filtering being coupled to the means for generating the multiplied signal to receive the multiplied signal;

wherein the means for generating the n-bit signal includes:

means for generating a one-bit modulated signal corresponding to the first signal;

means for filtering the one-bit modulated signal to provide a filtered signal; and means for sampling the filtered signal to generate the n-bit signal.

15. The apparatus of claim 14, wherein the means for sampling includes means for encoding the first n-bit signal using 1's complement numeric coding.

* * * * *